United States Patent [19]

Pohl et al.

[11] 4,287,939

[45] Sep. 8, 1981

[54] AIR CONDITIONING CONTROL SYSTEM WITH LOCAL AND REMOTE CONTROL CAPABILITIES

[75] Inventors: Walter J. Pohl, Louisville, Ky.; Arthur L. Burns, North Syracuse, N.Y.

[73] Assignee: General Electric Company, Louisville, Ky.

[21] Appl. No.: 180,216

[22] Filed: Aug. 21, 1980

[51] Int. Cl.³ .......................... G05D 23/00; H04Q 9/02
[52] U.S. Cl. .................................... 165/11 R; 236/51; 236/94; 307/155; 340/147 CN
[58] Field of Search ...................... 236/51, 94; 165/27, 165/11, 22; 340/147 CN, 147 C; 307/155, 115

[56] References Cited

U.S. PATENT DOCUMENTS

| | | | |
|---|---|---|---|
| 3,306,348 | 2/1967 | Tucker | 165/12 |
| 3,441,809 | 2/1969 | Newland | |
| 3,466,505 | 9/1969 | Anderson | |
| 3,469,151 | 9/1969 | Newland | |
| 3,585,595 | 6/1971 | Slavin et al. | 340/147 R |
| 3,629,614 | 12/1971 | Matthews | 307/305 |
| 3,931,481 | 1/1976 | Jackson | 179/99 |
| 4,077,566 | 3/1978 | Bradford | 236/51 X |
| 4,121,204 | 10/1978 | Welch et al. | 340/337 |
| 4,137,463 | 1/1979 | Scott et al. | 340/147 C |

Primary Examiner—William E. Wayner
Attorney, Agent, or Firm—Frank P. Giacalone; Radford M. Reams

[57] ABSTRACT

A versatile yet low cost mode selection control system for an air conditioning unit such as a combination heating and cooling unit having a plurality of operational modes, and which control system is capable of responding both to a relatively local mode selection unit and a relatively remote mode selection unit. Both the relatively local mode selection unit and the relatively remote mode selection unit can exercise independent control over the mode selection, not necessarily limited to mere on/off control, and either may override a selection made at the other at any time. Electronic momentary push button and holding circuitry is employed electronically provide a function similar to that of the prior art mechanical push button configuration wherein only one push button can be actuated at a time, with actuation of any one push button deactuating all others.

7 Claims, 7 Drawing Figures

AIR CONDITIONING CONTROL SYSTEM WITH LOCAL AND REMOTE CONTROL CAPABILITIES

BACKGROUND OF THE INVENTION

The present invention relates generally to mode selection control of air conditioning units, for example room-sized combination heating and cooling units. More particularly, the invention relates to such control systems having both relatively local mode selection capability and relatively remote mode selection capability, for example, from a central control desk of a hotel, office building, or the like.

A common configuration for a building heating and cooling system employs an individual air conditioning unit in each room of a hotel, office building, or the like, with individual room thermostatic and mode selection control. Such a system desireably facilitates zoned temperature control. That is, the temperature of each room may individually be adjusted as desired. Further, such a system permits overall economy of operation where not all rooms are occupied or in use at the same time. Unneeded units may simply be turned off.

A wide variety of specific types of air conditioning units have been employed for such purposes, and there is accordingly no intention to limit the present invention for use in combination with any particular such unit. Similarly, the term "air conditioning" is employed herein in a broad sense to mean any form of unit which alters the characteristics of room air, for example by either heating, cooling, or both, or even through humidity modification. As one example, a typical such room-sized unit includes an air cooling portion comprising a closed circuit refrigeration system having a refrigerant evaporator in heat exchange relationship with recirculating indoor air flow, and a separate heating portion comprising electrical resistance heaters. As another example, the closed circuit refrigeration system may be reversible and comprise what is conventionally termed a "heat pump" to provide heating, as well as cooling, with electrical resistance heating being required only for supplemental purposes. Also, a reversible air valve heat pump may be employed, where the evaporator and condenser retain their usual functions relative to the closed circuit refrigeration system, but indoor and outdoor airflows are selectively directed over the evaporator and condenser. Still other examples are radiator-like room-sized units which receive a circulating heat transfer medium such as heated or cooled water from a central location, and which include controlled valving or fan arrangements for regulating the amount of heating or cooling delivered to a particular room. It will be appreciated that such units are typically capable of various modes of operation. In addition to "heating" mode, "cooling" mode, and "off" mode, various other modes such as "high" and "low" fan speeds are frequently provided.

For selecting these various modes, different forms of mechanical selector switches have heretofore been employed, usually located on each individual room unit itself. Two common control configurations are a rotary detent-type switch and a interlocked mechanical push button arrangement with exclusive selection capability arranged such that, when a desired selection push button is depressed to complete a circuit to effect the particular function desired, all of the remaining push buttons automatically pop up.

As mentioned hereinabove, where various rooms are unoccupied or not in use at any particular time, energy savings and overall economy of operation can result where units are turned off when not needed. Examples are office buildings during the evenings and weekends, and hotel rooms any time a particular room is unoccupied.

Advantageously, central desk or remote control systems have heretofore been employed such that an attendant at the central desk of a hotel or the like can turn off units in unoccupied rooms, and turn on such units when a room is to be occupied. Similarly, in an office building, all units can be turned off during evenings and weekends. A typical such prior art system comprises a relatively simple control relay arrangement including a power relay to each air conditioning unit, with each relay having switching contacts in series with the line power supply to the particular individual unit. The central desk than has control over relay operation.

However, the limited capabilities of such a system result in a number of disadvantages. In particular, with such a prior art system, the basic mode selection is made at the room unit itself by means of a mechanical selector switch, and the central desk control can only turn the unit on or off. Moreover, if a particular unit is turned off at the central desk, it will normally not be possible to energize the unit at the location of the air conditioning unit itself, as might occur where a desk attendant inadvertently fails to reactivate a particular unit.

SUMMARY OF THE INVENTION

Accordingly, it is an object of the invention to provide a versatile yet low cost mode selection control system for an air conditioning unit such as a combination heating and cooling unit having a plurality of operational modes, and which control system is capable of responding both to a relatively local mode selection unit and a relatively remote mode selection unit. The relatively local mode selection unit may be located either on the room unit itself, or on a wall of the room.

It is another object of the invention to provide such a control system wherein both the relatively local mode selection unit and the relatively remote mode selection unit can exercise independent control over the mode selection, not necessarily limited to mere on/off control, and either may override a selection made at the other at any time.

It is still another object of the invention to provide specific control circuitry which facilitates connection of the various system components.

Briefly stated, and in accordance with an overall concept of the invention, electronic momentary push button and holding circuitry is advantageously applied to the control of such air conditioning units. To electronically provide a function similar to that of the prior art mechanical push button configuration wherein only one push button can be actuated at a time, with actuation of any one push button deactuating all others, the electronic system employs momentary contact single pole switching elements, with electronic circuitry providing the holding function to keep a selected circuit or mode energized even after a unit has released the push button. This eliminates the complexity required to mechanically interlock selector switches.

More importantly, by using an electronic latching or holding circuit, control from two locations, i.e., local and remote control, is readily possible at low cost. Since momentary contact switches are employed, either a relatively local or a relatively remote control unit can be operated at any time, with the most recent actuation overriding the previous actuation, without regard to whether the previous selection was from the relatively local or the relatively remote control unit.

Briefly stated, and in accordance with a more particular aspect of the invention, a control system for an air conditioning unit having a plurality of operational modes includes mode selection memory circuitry capable of storing and unstoring representations corresponding to each of the operational modes. This storing and unstoring capability is advantageously provided by a plurality of individual latching and unlatching circuit blocks. The memory circuitry has mode selection inputs responsive to momentary actuations and operable when a particular actuation occurs to store the representation corresponding to the particular selected mode, and to unstore any other representations. To actually control the air conditioning unit, there is an operative connection between the memory circuitry and the air conditioning unit to effect operation of the air conditioning unit in the mode corresponding to any particular stored representation.

To provide mode selection capability, a relatively local mode selection unit includes a plurality of momentarily actuable switching elements connected to the mode selection inputs of the mode selection memory circuitry, and additionally a relatively remote mode selection unit including at least one momentarily actuable switching element additionally connected to the mode selection memory circuitry for selecting at least one particular mode. Thus, if desired, the relatively remote mode selection unit may be somewhat simplified and capable of selecting only several of the possible modes of operation, with the relatively local mode selection unit having complete capability.

In a preferred configuration, the mode selection memory circuitry and the relatively local mode selection unit are physically co-located, either within the air conditioning unit itself or in a wall-mounted unit additionally including thermostatic control circuitry.

To simplify system installation, the memory circuitry preferably is arranged such that connections from the relatively remote mode selection unit can be made directly to memory circuitry output lines provided for operative connection to the air conditioning unit. In other words, a single set of lines may extend from the memory circuitry, and be used both as outputs to the air conditioning unit and as inputs to the memory circuitry. Thus, advantageously, the remote mode selection unit may be connected at either end of a multi-conductor cable extending between the memory circuitry and the air conditioning unit. Another advantage of this configuration is that the relatively remote mode selection unit may be provided with level detectors to conveniently indicate which state is selected, without the need for additional interconnecting wiring.

The relatively local mode selection unit, as well as the relatively remote mode selection unit, may comprise any form of switching element, ranging from a simple manual push button type switch to a solid state controlled switching device. However, a preferred form of switch for the relatively local mode selection unit is a membrane-type touch switch which has the characteristics of good appearance and cleanability. Other types of touch switches may also be employed, for example, capacitive type touch switches.

For connecting the relatively remote mode selection unit to the mode selection memory circuitry, a multi-conductor cable comprising an individual conductor for each mode for which remote selection capability is desired may be employed. However, particularly in large buildings where the expense of running a multiplicity of individual control cables would be high, a modulator/demodulator system is preferably employed. Such systems typically employ tone control signals, and may, for transmission, employ a single dedicated line pair running throughout the building, or alternatively, a carrier-current system distributing tone-modulated radio frequency carrier signals superimposed on the building electrical power distribution system.

In a central control system for a plurality of individual air conditioning units a single relatively remote mode selection unit may serve all units if desired. A relatively simple switching arrangement is required in such a case for the purpose of connecting the relatively remote mode selection unit to either a particular one or selected ones of the air conditioning units at any one time. Also, if individual relatively remote mode selection units are to be employed, they may conveniently be located within a single housing.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENTS

Figure 1:
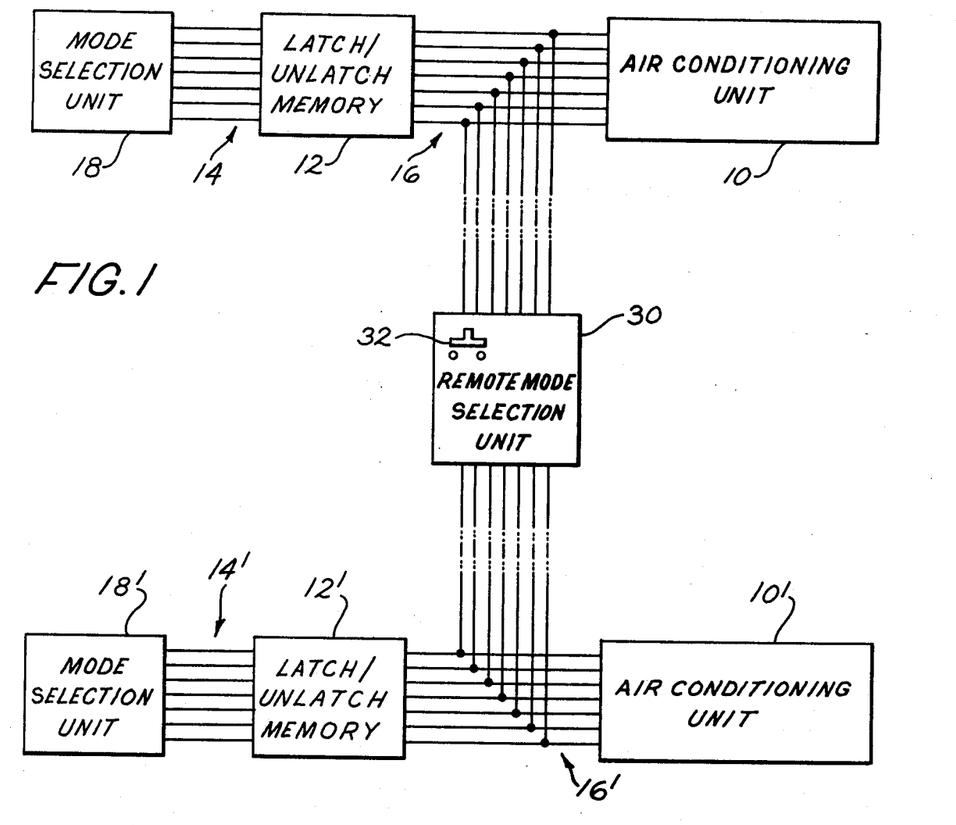
FIG. 1 is an overall block diagram of one form of system in accordance with the invention for controlling a plurality of air conditioning units, two such units being illustrated, with output lines from each co-located relatively local mode selection unit and selection memory pair connected to the air conditioning units also serving as input connections from the relatively remote mode selection unit.

Referring first to FIG. 1, a control system for a plurality of air conditioning units represented by units 10 and 10' includes, for each of the units 10 and 10', corresponding mode selection memory circuitry shown as simple latch/unlatch memories 12 and 12'. In particular, each of the memories 12 and 12' is capable of storing and unstoring representations corresponding to each of the operational modes of the air conditioning units 10 and 10'. The memories 12 and 12' have mode selection inputs 14 and 14' responsive to momentary actuations, and are operable, when a particular actuation occurs, to store the representation corresponding to the particular selected mode and to unstore any other representations.

The air conditioning units 10 and 10' may be any type of unit for which mode selection control is desired, as discussed hereinabove under the heading "Background of the Invention." In particular, by way of example and not by way of limitation, each of the units 10 and 10' may be capable of a heating mode, a cooling mode, an OFF mode, and various fan speed modes. The particular way in which these modes are implemented within the units 10 and 10' will of course depend upon the particular form of air condition unit, and, as will be appreciated by those skilled in the art, may be implemented through suitable integrated circuit, comparator, or relay arrangements, appropriate to the particular form of unit.

Between each of the memories 12 and 12' and the corresponding air conditioning unit 10 and 10' is an operative connection represented by sets of conductors 16 and 16' to effect operation of the air conditioning 10 and 10' in the mode corresponding to any particular representation stored in the corresponding memory 12 or 12'. In the particular embodiments described herein, an individual one of the conductors in the sets 16 and 16' is dedicated to each individual mode. However, various coding arrangements, e.g., Binary Coded Decimal, may as well be employed.

Figure 4:
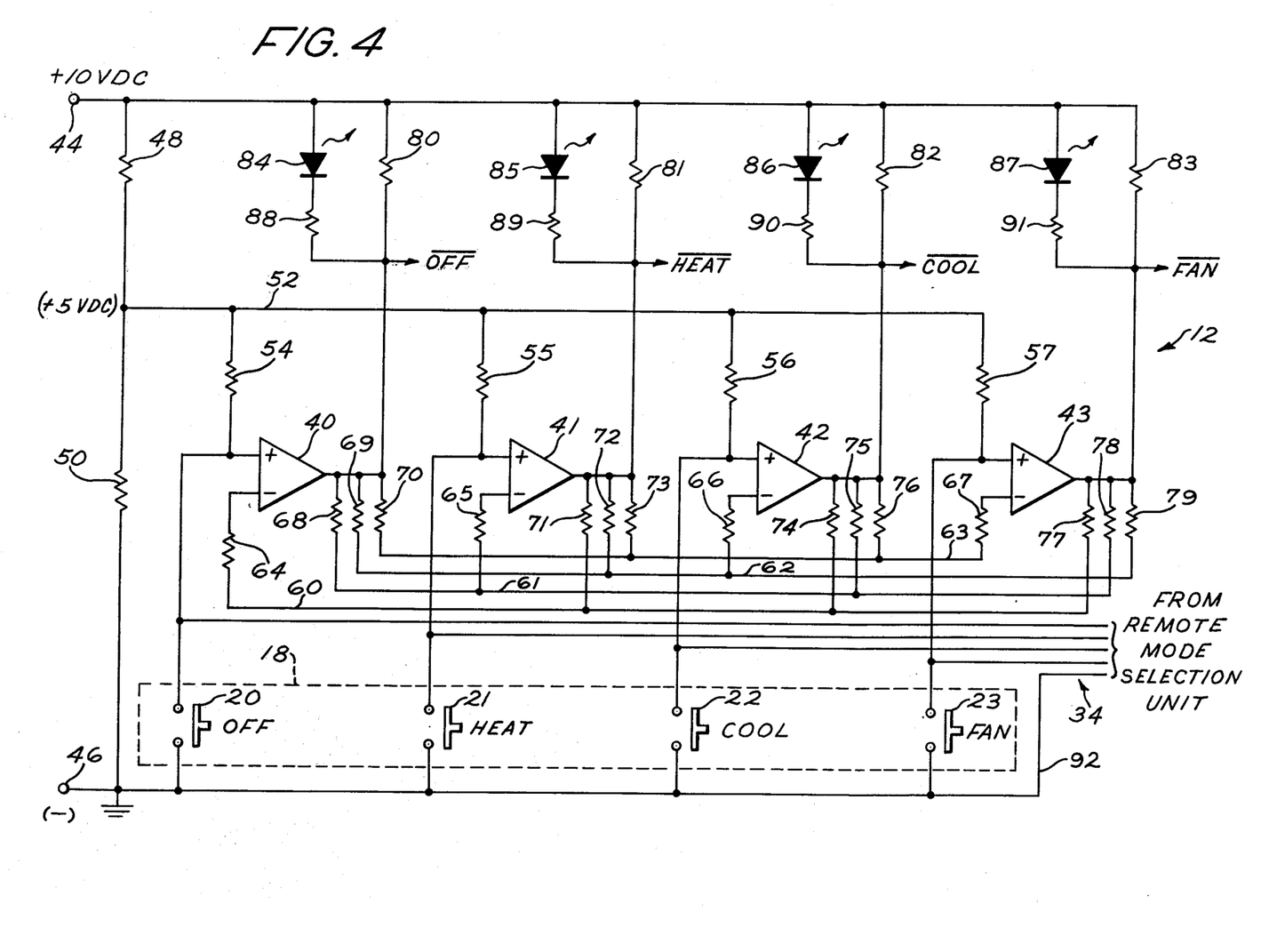
FIG. 4 is an electrical schematic diagram of one form of local mode selection unit and relatively mode selection memory circuitry comprising integrated circuit comparators.
Figure 5:
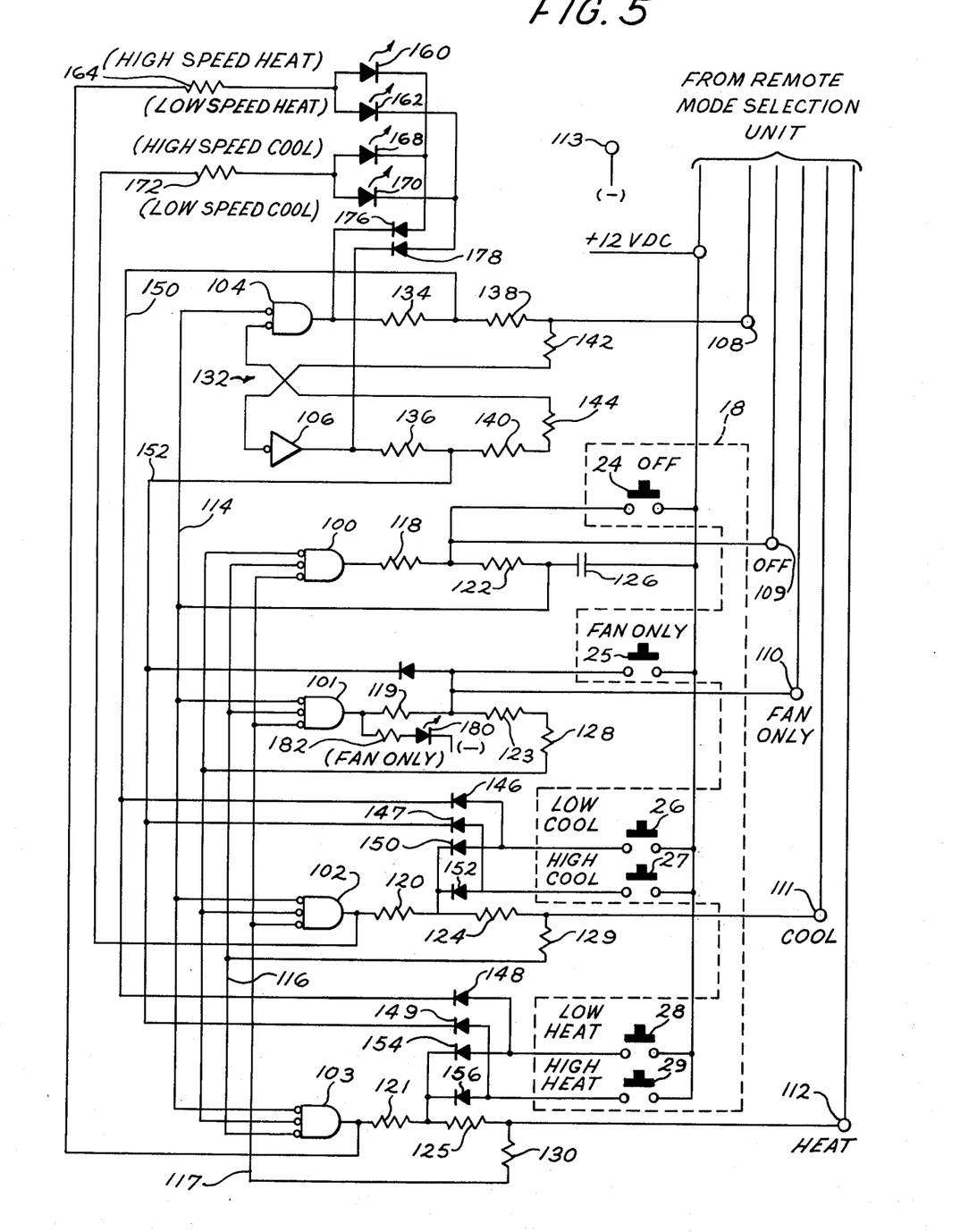
FIG. 5 is an alternative embodiment of mode selection memory circuitry employing integrated circuit digital logic elements.

For local mode selection, that is, mode selection from the room itself, relatively local mode selection units 18 and 18' are provided, each of the mode selection units 18 and 18' including a plurality of momentarily actuable switching elements 20–23 (FIG. 4) or 24–29 (FIG. 5). While the momentarily actuable switching elements 20–29 shown in FIGS. 4 and 5 are depicted as push button switches, this is representative only, as a wide variety of switching elements may be employed.

A remaining element shown in FIG. 1 is a relatively remote mode selection unit 30 including at least one momentarily actuable switching element, such as the representative push button switch 32, and additionally connected to the mode selection memory circuitry 12 for entering mode selections therein.

In the system configuration of FIG. 1, the memory circuitry 12 includes a plurality of output lines represented by the conductor set 16 for operative connection to the air conditioning unit 10. Additionally, the memory circuitry 12 is arranged such that input connections from the relatively remote mode selection unit 30 may be made directly to these output lines 16, thereby simplifying system installation. In particular, the air conditioning unit 10 may be mounted within an opening through an outside wall of the room. The memory 12 and mode selection unit 18 could then be physically located together on a wall of the room, with a multiconductor cable comprising the conductor set 16 extending between the co-located mode selection unit 18 and memory 12, on the one hand, and the air conditioning unit 10 on the other hand. The arrangement illustrated in FIG. 1 permitting the remote mode selection unit 30 to be connected directly to the conductors 16 thus permits these connections to be made at either end of the conductors 16, either at the air conditioning unit 10 or at the memory 12. One particular circuit implementing this approach is described hereinafter with particular reference to FIG. 5.

Further, by means of level detectors (not shown) the relatively remote mode selection unit 30 may sense the signals on the conductors of the set 16 to indicate which particular mode is active at any given time.

Figure 2:
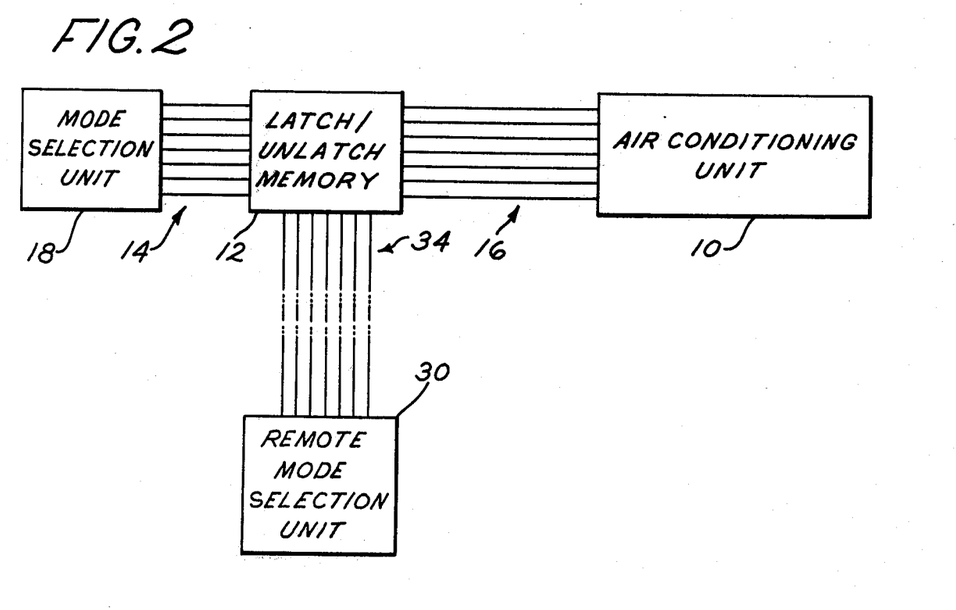
FIG. 2 is a block diagram similar to that of FIG. 1, but showing only a single air conditioning unit, with input signals from the relatively remote mode selection unit being applied to the selection memory through separate input connections.

Referring now briefly to FIG. 2, wherein corresponding elements are denoted by identical reference numerals, there is in contrast illustrated an alternative arrangement wherein the relatively remote mode selection unit 30 is connected to the memory circuitry 12 by means of conductors 34 separate from the conductors 16 connecting the memory circuitry 12 to the air conditioning unit 10. One particular circuit implementing this approach is described hereinafter with particular reference to FIG. 4.

Figure 3:
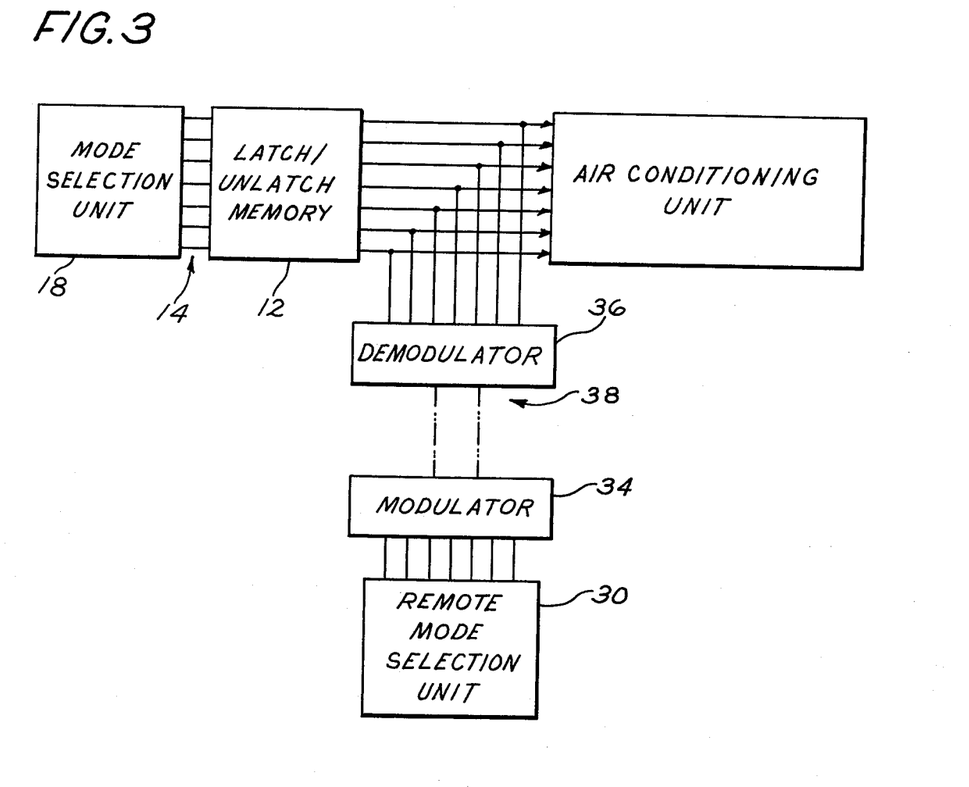
FIG. 3 is still another block diagram of a control system configuration wherein a modulator/demodulator pair is employed to minimize the number of control conductors required from the relatively remote mode selection unit.

FIG. 3 illustrates in block diagram form yet another system configuration, similar to that of FIG. 1, but employing a modulator/demodulator pair comprising a modulator 34 and a demodulator 36 for making connections between the remote mode selection unit 30 and the memory circuitry 12. This arrangement permits replacing the multiple conductors shown in FIG. 1 connecting the remote mode selection unit 30 to the latch/unlatch circuitry 12 with a single line pair 38.

It will be appreciated that a variety of suitable modulator 34 and demodulator 36 systems are known in the art, and the present invention is not directed to the modulator/demodulator pair itself. Such modulator/demodulator pairs typically comprise tone systems wherein a plurality of individual tones are generated by the modulator unit 34 on command, and individually recognized by the demodulator. The line pair 38 may be a dedicated pair of lines extending throughout the building, and carry appropriately coded tones from a centralized modulator 34 to a plurality of individual demodulators such as the demodulator 36 to individual air conditioning units and associated control memory circuitry. As an alternative, a carrier current system may be employed wherein a radio frequency carrier is superimposed on the building power supply or wiring system, with appropriate tone modulation to effect signaling.

Referring now to FIG. 4, there is illustrated a detailed schematic diagram of a particular form of memory circuit arrangement employing a plurality of comparators with interconnecting and latching resistors.

In FIG. 4 the relatively local mode selection unit 18 of FIG. 2 may more particularly be seen to comprise the four momentary switches 20–23, with the mode selection memory 12 generally comprising a comparator and resistor arrangement. In FIG. 4, there are four comparators 40–43, which preferably are included within a single integrated circuit package such as a Motorola Type No. MC3302P Quad Single-Supply Comparator Integrated Circuit, or equivalent. (It will be understood, however, that the specific component values identified herein are given by way of example to enable those skilled in the art to practice the invention without undue experimentation, and are not in any way intended to limit the scope of the invention.) A suitable DC supply (not shown) supplies +10 volts DC to a terminal 44 with reference to a grounded reference terminal 46. A voltage divider comprising equal-valued resistors 48 and 50, for example 75K Ohms each, provides +5 volts DC on a reference voltage supply line 52. It will be appreciated that suitable supply connections to the comparators 40-43 are also required, these supply connections being omitted for clarity of illustration.

In FIG. 4, the non-inverting (+) inputs of each of the comparators 40-43 are tied to the +5 volt DC line 52 through individual biasing resistors 54-57, each having a typical resistance value of 150K Ohm. The switching elements 20-23 are connected so as to momentarily shunt the non-inverting (+) input of their respective comparators 40-43 to the negative supply conductor 46 when actuated. Thus, each of the comparator non-inverting (+) inputs is normally held at +5 volts, and momentarily goes low to zero volts when the corresponding switching element is actuated.

The interconnecting resistor arrangement employs a plurality of interconnecting lines 60-63 connected through individual resistors 64-67 to the comparator inverting (−) inputs. Each of the lines 60-63 corresponding to the individual comparators 40-43 is supplied from the outputs of each of the other comparators through resistors 68-79, but not from the output of its own comparator. Each of the resistors 64-79 is preferably the same resistance value, for example, one megohm.

To provide useful output, each of the comparators 40-43 has a respective output pull up resistor 80-83 connected to the +10 volt DC line, and the comparator outputs are connected to respective output conductors. The output conductors in the particular circuit illustrated are labeled $\overline{\text{OFF}}$, $\overline{\text{HEAT}}$, $\overline{\text{COOL}}$ and $\overline{\text{FAN}}$. The bars over each of these names indicate that the output is active-low. That is, the indicated mode is called for when the corresponding output is near zero volts, and is not called for when the corresponding output is near +10 volts.

To indicate which particular selection is active at any particular time, visual indicators, such as light emitting diodes (LED'S) 84-83 are connected through respective series current-limiting resistors 88-91 between the +10 volt DC supply line and the comparator outputs.

In the operation of the FIG. 4 circuit as thus far described, for local mode control, actuation of any one of the momentarily actuable switching elements 20-23 pulls the non-inverting (+) input of the corresponding comparator 40-43 lower than the comparator inverting (−) input. This causes the particular comparator output to go low as well, which defines the "ON" state. The corresponding output line, $\overline{\text{OFF}}$, $\overline{\text{HEAT}}$, $\overline{\text{COOL}}$ or $\overline{\text{FAN}}$ goes low, and the corresponding indicator LED 84-87 illuminates.

At the same time, an unlatching arrangement comprising the lines 60-63 and associated resistors pulls the inverting (−) input of each of the other comparators in the system lower than the respective comparator non-inverting (+) inputs, which are biased at a fixed +5 volts DC. The outputs of these other comparators then go high, defining the "OFF" state.

The particular selected comparator circuit is latched "ON" even after the associated switching element has been released because the selected comparator inverting (−) input is pulled to a voltage higher than the +5 volts normally on its non-inverting (+) input due to the connections through the respective one of the lines 60-63 to the outputs of the other comparators.

Thus, it will be appreciated that the circuit implements the function of remembering a particular selected function through a latching operation, and additionally provides exclusive selection through unlatching operation which insures that only one of the comparator circuits can be latched in its output-low condition at any one time.

By way of specific example for the particular voltage and component values shown in FIG. 4, assuming the HEAT switching element 21 is momentarily actuated to pull the comparator 41 non-inverting (+) input low, the comparator 41 output goes low, to nearly zero volts. The connections through the resistors 71, 72 and 73 to the interconnecting lines 60, 62 and 63 and the resistors 64, 66 and 67 pull the inverting (−) inputs of the comparators 40, 42 and 43 to approximately 3.4 volts, as may be seen from an analysis of the voltage divider effect of the parallel and series combinations of the various resistors involved. This 3.4 volts being less than the +5 volts maintained on these comparator non-inverting (+) inputs, the comparators 40, 42 and 43 outputs all go high, and the other inverting (−) inputs all remain at approximately 3.4 volts.

Similarly, the voltage on the comparator 41 inverting (−) input is nearly ten volts, depending on the precise external load on the other comparators 40, 42 and 43.

The remaining connections shown in FIG. 4 are conductors 34 from the remote mode selection unit 30, with the particular connections shown corresponding to those illustrated generally in FIG. 2. In particular, the remote mode selection unit 30 may comprise quite simply at least one, but preferably a plurality, of individual momentarily actuable switching elements connected electrically in parallel with the switches 20-23. A single negative return connection through a conductor 92 serves each of the switching elements in the remote mode selection unit.

It will be appreciated, therefore, that either the switches of the relatively local mode selection unit 18 or the electrically parallel switches in the remote mode selection unit 30 can operate the FIG. 4 circuit to effect the functions described hereinabove. Briefly, exclusive selection of one mode at a time is provided by the unlatching arrangement. Either the relatively local or the relatively remote mode selection unit may override the other at any time due to the electrically parallel connection of selection switching elements in combination with the latching arrangement.

Referring now to FIG. 5, an electrical schematic diagram of an alternative form of mode selection memory circuity is shown, for use in a system configuration generally corresponding to that of FIG. 1. The circuit of FIG. 5 uses CMOS integrated circuit digital logic elements, for example those selected from the CD4000 series manufactured by RCA Corporation.

More particularly, the FIG. 5 circuit employs six three-input integrated circuit logic NOR gates included within RCA Type No. CD4025 triple three-input NOR gate COS/MOS integrated circuit packages, and supplied from a +12 volt DC supply. Again, for clarity of illustration, the necessary supply connections to the integrated circuits are not shown. Four of the NOR gate sections are denoted by reference numerals 100-103, and are depicted in their logical equivalent form as low-activated AND gates for consistency with actual circuit context. Another one of these gates is designated 104 and is configured as a two-input low-activated AND gate by tying two of the three inputs together. The remaining logic gate is configured as an inverter 106 by tying all three inputs together.

The FIG. 5 circuit includes five output terminals 108-112 for connection to the air conditioning unit 10

(FIG. 1). The +12 volts DC preferably is supplied from the air conditioning unit 10, with reference to a negative supply terminal 113. In FIG. 5, these output terminals 108–112 are appropriately labeled LOW FAN SPEED, OFF, FAN ONLY, COOL and HEAT. It is a particular feature of the FIG. 5 circuit that inputs from the remote mode selection unit 30 may be connected to these same output terminals 108–112 as described hereinabove with particular reference to FIG. 1, thus simplifying the overall connections to the system. The FIG. 5 circuit is intended for connection to a remote mode selection unit comprising five single pole momentary switches, or equivalent, which function to momentarily connect +12 volts DC to any particular selected one of the terminals 108–112.

The output impedance the FIG. 5 circuit is relatively high, in excess of one megohm in the case of output terminals 108, 111 and 112. Accordingly, the air conditioning unit 10 to which the FIG. 5 circuit is connected to control must have relatively high impedance inputs so as to not unduly load the FIG. 5 latching memory circuit outputs. Suitable interfacing elements (not shown) within the air conditioning unit 10, appropriate for the particular type of unit 10 employed, may comprise additional CMOS digital logic devices which are characterized by high input impedance, or various comparator arrangements.

Considering the details of the FIG. 5 circuit, the four low-activated AND gates 100–103 are arranged in similar fashion to the comparators of FIG. 4 to produce essentially identical interlocking and latching functions. The output of each of the low-activated AND gates 100–103 is connected back to an unlatching configuration to an input of each of the other low-activated AND gates 100–103, but not to one of its own inputs. As a result, when any one particular low-activated AND gate circuit is selected and is activated (defined as a logic high output in this system), all of the other low-activated AND gates have their outputs low. With all of the other low-activated AND gates not activated, that is with their outputs at logic low and connected to inputs of the particular selected low-activated AND gate, its output is latched into a logic high condition.

Specifically, four interconnecting lines 114–117 (generally corresponding to the lines 60–63 of FIG. 4) are supplied from output networks of the respective low-activated AND gates 100–103. Again, while the specific component values identified herein are given by way of example to enable those skilled in the art to practice the invention without undue experimentation, and are not in any way intended to limit the scope of the invention, it may be noted that the outputs of the low-activated AND gates 100–103 are each directly connected to respective 10K Ohm series resistors 118–121, and then through respective one megohm series resistors 122–125. The interconnecting line 114 supplied from the output of the low-activated AND gate 100 is more particularly supplied from the far end of the resistor 122, with a 0.005 mfd transient suppression capacitor 126 also connected to the +12 volt DC supply line. The output networks of the other three low-activated NOR gates 101, 102 and 103 have respective 10K Ohm series resistors 128, 129 and 130 supplying the respective interconnecting lines 115, 116 and 117.

The OFF and FAN ONLY output terminals 109 and 110 have a relatively low output impedance, being connected to the junction of the resistors 118 and 122 in the one case, and to the junction of the resistors 119 and 123 in the other case. The output terminals 111 and 112 for COOL and HEAT are of relatively higher impedance, being connected in the one case to the junction of the resistors 124 and 129, and in the other case to the junction of the resistors 125 and 130.

The connection of the switches 24–29 of the relatively local mode selection unit 18 is somewhat different in FIG. 5 compared to FIG. 4 in that the selection inputs are introduced in the low-activated AND gate output networks, rather than at an input, and unlatching feedback is relied upon to deactivate each of the other low-activated AND gates. The outputs of each of these other low-activated AND gates then going low activates the selected gate.

Several of the selection push button switches 24–29 are also connected through isolation diodes to control a fan speed flip-flop 132 comprising the gates 104 and 106 connected in a cross-sectional configuration. Specifically, when low fan speed is selected, the output of the low-activated AND gate 104 is high, and the output of the inverter 106 is low. When high fan speed is selected, the opposite is true.

In the particular circuit configuration, each of these gates 104 and 106 has an output network similar to that of the other four gates 100–103, specifically comprising 10K Ohm resistors 134 and 136, one megohm resistors 138 and 140, and further 10K Ohm resistors 142 and 144. The resistor 142 in the output network of the low-activated AND gate 104 is connected to the input of the inverter 106, and the resistor 144 in the output network of the inverter 106 is connected to an input of the low-activated AND gate 104.

In order to allow the selection of low and high fan speeds for both heating and cooling mode, the appropriate switching elements 26, 27, 28 and 29 are connected through respective isolation diodes 146–149 to a pair of lines 150 and 152 for selecting low and high fan speed respectively when a switch closure applies a logic high signal to the output network of the particular gate of the pair 104 and 106, and therefore, as cross coupled feedback, to the input of the other gate.

For selecting the COOL mode, the low cool and the high cool switching elements 26 and 27 are connected through respective isolation diodes 150 and 152 to the output network of the low-activated AND gate 102, specifically to the junction of the resistors 120 and 124. Similarly, the low heat and high heat push button switches 28 and 29, respectively, are connected through isolation diodes 154 and 156 to the output network of the low-activated AND gate 103.

The fan only switching element 25, in addition to being connected to the output network of the low-activated AND gate 101, is connected through an isolation diode 158 to the line 152 for the purpose of ensuring that high fan speed results whenever the fan only mode is selected.

Several indicators in the form of light emitting diodes (LED's) are also included in the FIG. 5 circuit. For indicating the selection of high fan speed heat mode and low fan speed heat mode, LED's 160 and 162 are respectively provided, and are supplied through a common current-limiting resistor 164 via a line 166 directly from the output of the low-activated AND gate 103, the output of which is high when the HEAT mode is selected. Similarly, LED's 168 and 170 are respectively provided for indicating high fan speed cool mode and low fan speed cool mode, and are supplied through a common current-limiting resistor 172 through a line 174 connected directly to the output of the low-activated AND gate 102, the output of which is high when the cool mode is selected. To complete the connections to the LED's 160, 162, 168 and 170, the high speed heat LED 160 and the high speed cool LED 168 are connected through a common isolation diode 176 directly to the output of the low-activated AND gate 104 comprising an element of the fan speed flip-flop 132, the output of the gate 104 being low when high fan speed is selected. Similarly, the low speed heat LED 162 and the low speed cool LED 170 are connected through a common isolation diode 178 directly to the output of the inverter 106, the output of which is low when low fan speed is selected.

To indicate selection of the fan only mode, an LED 180 and series current-limiting resistor 182 are connected between the output of the low-activated AND gate 101 and the negative supply line.

Functionally, the operation of the FIG. 5 circuit is essentially identical to that of FIG. 4 in that mode selection may be accomplished either by means of the momentarily actuable switching elements 24-29 of the relatively local mode selection unit 18, or through similar momentarily actuable switching elements included within the relatively remote mode selection unit 30 and connected directly to the output terminals 108-112.

As an example of the operation, it will be assumed that the "low cool" momentarily actuable switching element 26 of the relatively local mode selection 18 is momentarily actuated. This applies a logic high signal through the isolation diode 150 to the output network of the low-activated AND gate 102. This logic high signal level is then applied through the resistors 124 and 129 to the interconnecting line 116, which is connected to one of the low-active inputs of each of the other three low-activated AND gates 100, 101 and 103. This high signal causes the outputs of the gates 100, 101 and 103 to go high. With these three outputs all high, all three inputs of the low-activated AND gate 102 are low due to the connections through the interconnecting lines 114, 115 and 117, thus effectively latching the low-activated AND gate 102 in its active state, i.e., logic high output.

At this point, it may be noted that the identical result (insofar as the low-activated AND gates 100-103 are concerned) occurs when a +12 volt DC signal (logic high) is applied directly to the COOL output terminal 111 by means of a switching element within the remote mode selection unit 30. In particular, the logic high signal feeds through the resistor 129 to supply the selection line 116, with the same result as before.

Additionally, when the low cool switching element 26 ia momentarily actuated, a logic high signal is applied through the isolation diode 146 and through the line 150 to the output network of the low-activated AND gate 104, thus applying a logic high signal to an input of the inverter 106, causing the inverter 106 to be deactivated, and its output to go low. This logic low level couples through the resistors 136, 140 and 144 to activate the low-activated AND gate 104, is the condition for low fan speed. The circuit remains latched in this state.

Figure 6:
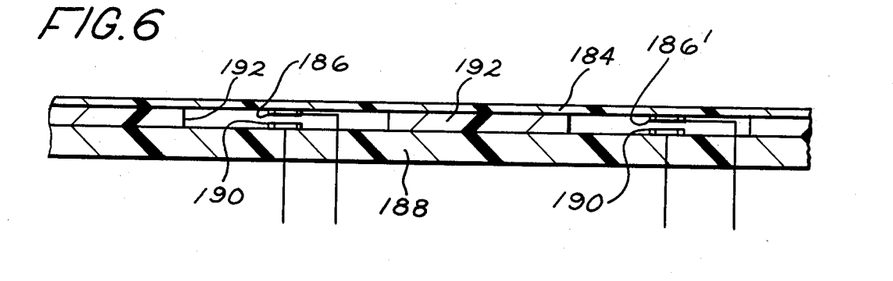
FIG. 6 is a cross sectional representation of a membrane-type touch switch.

As mentioned hereinabove, the momentarily actuable switching elements, particularly those in the relatively local mode selection unit 18, are preferably membrane type touch switches. Such touch switches may take a variety of forms, and one such form of membrane touch switch is shown in FIG. 6. However, the following U.S. patents are identified by way of further example for their disclosures of various forms of membrane touch switches: Sudduth U.S. Pat. No. 3,699,294; Larson U.S. Pat. Nos. 3,998,511, 3,995,126 and 4,034,176; and Johnson et al U.S. Pat. No. 4,046,981.

Briefly, and with particular reference to FIG. 6, a membrane touch switch generally comprises a relatively flat deformable plastic membrane 184 carrying conductive material such as contact members 186 and 186' on the underside thereof. Such a switch additionally has a relatively rigid insulative substrate 188 carrying mating contacts 190 and 190', with spacers 192 between the flexible membrane 184 and the substrate 188. When directly actuated by finger pressure, the membrane 184 slightly deforms to bring the contact pairs 186 and 190 or 186' and 190' into contact, thus completing the circuit. Although not shown in FIG. 6, many such switches include a metallic snap dome just below the membrane 184 to impart a tactile "feel" to the switch action.

Figure 7:
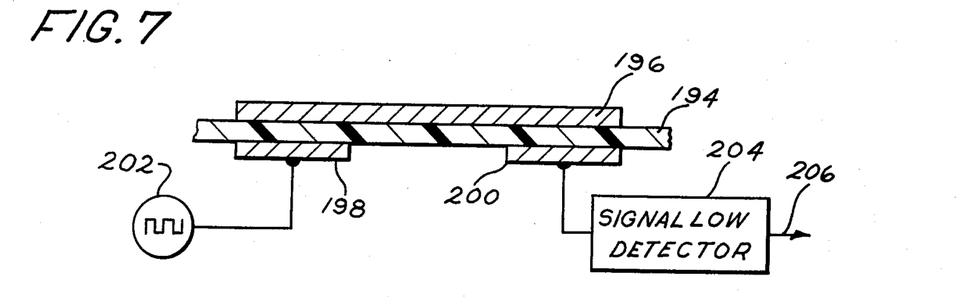
FIG. 7 is a cross-sectional representation of a capacitive attenuator type touch switch.

Referring lastly to FIG. 7, there is shown, by way of further example, a capacitive attenuator type touch switch, which may also may be employed as a momentarily actuable switch element in a control system of the invention. In particular, a representative capacitive attenuator type touch switch of FIG. 7 includes a dielectric panel 194 with a relatively thin conductive touch pad 196 on the front surface thereof. On the rear of the dielectric panel 194 are a pair of conductive pads 198 and 200, each capacitively coupled through the panel dielectric 194 to the front touch pad 196. A square wave signal source 202, for example in the order of 20 kHz is coupled to one of the rear pads 198, and the other of the rear pads 200 is connected to a signal loss detector to 204 having an output line 206.

In operation, normally the 20 kHz signal from the generator 202 is coupled through a first capacitor comprising the rear pad 198 and the front pad 196, and then through a second capacitor comprising the front pad 196 and the other rear pad 200, to the signal loss detector 204, which is arranged to be inactive when a signal is present. When a user touches the touch pad 196, body capacitance to ground attenuates a portion of the 20 kHz signal, and the signal loss detector 204 responds to indicate the pad has been touched, and complete the appropriate circuit in FIG. 4 or FIG. 5, through suitable interfacing, to cause the mode selection to occur.

It will be apparent therefore that the present invention provides an improved control system for an air conditioning unit, facilitating both local and remote control through electronic latching and unlatching memory circuitry.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A control system for an air conditioning unit having a plurality of operational modes, said control system comprising:
   mode selection memory circuitry capable of storing and unstoring representations corresponding to each of the operational modes, said memory circuitry having mode selection inputs responsive to momentary actuations and operable when a particular actuation occurs to store the representation corresponding to the particular selected mode and to unstore any other representations;

an operative connection between said memory circuitry and the air conditioning unit to effect operation of the air conditioning unit in the mode corresponding to any particular stored representation;

a relatively local mode selection unit including a plurality of momentarily actuable switching elements connected to said mode selection inputs; and a relatively remote mode selection unit including at least one momentarily actuable switching element additionally connected to said mode selection memory circuitry for selecting at least one particular mode.

2. A control system according to claim 1, wherein:

said memory circuitry includes a plurality of output lines for operative connection to the air conditioning unit; and wherein said memory circuitry is arranged such that connections from said relatively remote mode selection unit may be made directly to said output lines, thereby simplifying system installation.

3. A control system according to claim 1, wherein said remote mode selection unit is connected to said mode selection memory circuitry by means of an individual conductor for each mode for which remote selection is desired.

4. A control system according to claim 1, which further comprises a modulator/demodulator pair for transmitting selection signals from said relatively remote mode selection unit to said mode selection memory circuitry.

5. A control system according to claim 1, wherein said mode selection memory circuitry and said relatively local mode selection unit are physically co-located.

6. A control system according to claim 1, wherein said momentarily actuable switching elements included in said relatively local mode selection unit are membrane-type touch switches.

7. A central control system for a plurality of air conditioning units each having a plurality of operational modes, said control system comprising:

mode selection memory circuitry for each of the units capable of storing and unstoring representations corresponding to each of the operational modes, said memory circuitry having mode selection inputs responsive to momentary actuations and operable when a particular actuation occurs to store the representation corresponding to the particular selected mode and to unstore any other representations;

an operative connection between said memory circuitry and the corresponding air conditioning unit to effect operation of the air conditioning unit in the mode corresponding to any particular stored representation;

a relatively local mode selection unit for each of the air conditioning units, each relatively local mode selection unit including a plurality of momentarily actuable switching elements connected to said mode selection inputs; and a relatively remote mode selection unit including at least one momentarily actuable switching element additionally connected to each mode selection memory circuitry for selecting at least one particular mode.

* * * * *